Patented Nov. 19, 1940

2,222,383

UNITED STATES PATENT OFFICE 2,222,383

HYDRATED HYDROXYPHENYL ARSINOXIDE SULPHATE AND PROCESS OF MAKING IT

Benjamin F. Tullar, Detroit, Mich., assignor to Parke, Davis & Company, Detroit, Mich., a corporation of Michigan No Drawing. Application August 21, 1937, Serial No. 160,352

4 Claims. (Cl. 260—440)

The invention is concerned with a new derivative of 3-amino-4-hydroxy phenylarsinoxide and its preparation.

I have found that 3-amino-4-hydroxy phenylarsinoxide can be reacted with sulphuric acid to form a new crystalline sulphate of 3-amino-4-hydroxy phenylarsinoxide, useful as a new chemical substance and therapeutically.

The following example will serve to illustrate the invention.

Example 43.5 grams of 3-amino-4-hydroxy phenylarsinoxide, prepared for example as described in copending application of Albert B. Scott and James A. Sultzaberger Serial No. 160,349, filed August 21, 1937, is mixed with a solution of 5.32 cc. of concentrated sulphuric acid (9.8 grams) in 160 cc. of water. The resulting solution is treated with decolorizing charcoal and filtered. The filtrate is cooled to 0° C. where crystallization occurs. The crystals are the sulphate of 3-amino-4-hydroxy phenylarsinoxide. They are filtered off and dried over phosphorus pentoxide or in a high vacuum.

Anal. Calc. for $C_6H_6O_2NAs.\tfrac{1}{2}H_2O\tfrac{1}{2}H_2SO_4$ As, 29.10%. Found: As, 28.94%.

The composition of the new compound can be expressed by the formula,

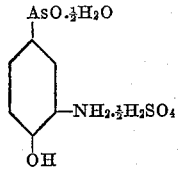

The crystals are colorless and less soluble in water than the known hydrochloride of 3-amino-4-hydroxy phenylarsinoxide containing ½ mole of alcohol per mole of arsinoxide.

Due to the ease with which crystals of the sulphate separate from aqueous solution, it is not necessary to use the exact proportions of 3-amino-4-hydroxy phenylarsinoxide free base and sulphuric acid as called for by the above formula. Moreover, an acid sulphate or other equivalent compound or compounds capable of giving sulphuric acid in solution can be reacted with the arsinoxide free base instead of sulphuric acid itself.

Either the amorphous anhydrous form of 3-amino-4-hydroxy phenylarsinoxide or its hydrated crystalline form may be reacted. The latter form is described in the copending application of Albert B. Scott, Ralph D. Humel, Benjamin F. Tullar & Joseph Wainwright, Serial No. 160,350, filed August 21, 1937.

What I claim as my invention is:

1. Crystalline hydrated 3-amino-4-hydroxy phenylarsinoxide sulphate.

2. A compound having the following formula:

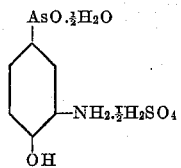

3. The method of preparing a compound having the formula,

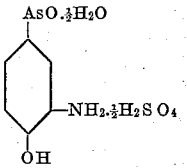

which comprises reacting an alcohol-free 3-amino-4-hydroxy phenyl arsinoxide free base compound with sulphuric acid and separating therefrom the crystalline sulphate of 3-amino-4-hydroxy phenyl arsinoxide.

4. The method of preparing a compound having the formula,

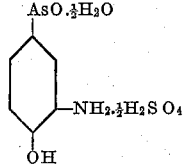

which comprises reacting an alcohol-free 3-amino-4-hydroxy phenyl arsinoxide free base compound with sulphuric acid, separating the liquid from any solid matter, cooling the liquid until crystallization occurs and separating from the liquid the crystalline sulphate of 3-amino-4-hydroxy phenyl arsinoxide.

BENJAMIN F. TULLAR.